United States Patent
Lisboa

[11] Patent Number: 5,460,706
[45] Date of Patent: Oct. 24, 1995

[54] ELECTROLYTIC CELL FOR THE GENERATION OF HYPO HALOGENITES FOR WATER TREATMENT

[76] Inventor: Alcides dos Santos Lisboa, Rua Cardoso de Almeida, 841 - Apt 161-B, Sao Paulo, Brazil

[21] Appl. No.: 327,274

[22] Filed: Oct. 21, 1994

[30] Foreign Application Priority Data

Oct. 27, 1993 [BR] Brazil ................................. 9304063
Jun. 1, 1994 [BR] Brazil ................................. 9401759

[51] Int. Cl.[6] .............................. C25B 9/00; C25B 15/08
[52] U.S. Cl. ..................... 204/269; 204/270; 204/271
[58] Field of Search .................................. 204/269, 270, 204/268, 271, 257

[56] References Cited

U.S. PATENT DOCUMENTS

| | | | |
|---|---|---|---|
| 3,766,045 | 10/1973 | Itakura et al. | 204/270 |
| 4,392,937 | 7/1983 | Schmitt et al. | 204/269 |
| 4,619,749 | 10/1986 | Nusbaum | 204/269 X |
| 4,790,923 | 12/1988 | Stillman | 204/271 X |
| 4,861,451 | 8/1989 | David | 204/269 X |

*Primary Examiner*—Donald R. Valentine
*Attorney, Agent, or Firm*—Mathews, Woodbridge & Collins

[57] ABSTRACT

Electrolyte cell for Hypo-Halogenite generation comprising a closed chamber made of a base (1) above which an electrode chamber (2) is placed. The base (1) has means to install it in a hydraulic system where the electrolyte inlet (13) and outlet (14) are located giving the electrolyte an inverted "U"-shape course between the inlet (13) and the outlet (14). The chamber (2) has an internal set of electrodes (4) over which electrolysis occurs and whose terminals (5, 6) communicate outside through a hole (68) in the electrode chamber. The base (1) has an internal transversely placed vertical barrier (15) made of two transversal walls separated by a top gutter (16) with a centralized vertical passing slit (17) running from the top to its mid-height, so that the base (1) is divided into two symmetrically equal sub-chambers, an inlet chamber adjacent to the inlet hole (13) and an outlet chamber adjacent to the outlet hole (14). The chamber is (2) bell-shaped, and is occupied by a beam (4) formed by two sets of electrodes (36, 37). The first set (36) is electrically connected to a terminal (5) and the second set is also electrically connected to a terminal (6). The sets of electrodes (36, 37) are kept in place by at least one toothed rod (40) which supports the electrodes above the vertical barrier (15) of the base (1).

17 Claims, 10 Drawing Sheets

ELECTROLYTIC CELL FOR THE GENERATION OF HYPO HALOGENITES FOR WATER TREATMENT

BACKGROUND OF THE INVENTION

This invention refers to an electrolytic cell for the generation of hypo-halogenites in a continuous process.

The electrolysis of halogenites in a liquid medium producing acid hypo-halogenites or their corresponding salts has been employed for disinfection treatments of water in general, especially for water in swimming pools, cooling towers and reservoirs, including drinking water and waste water.

There are several types of electrolytic cells for this end, installed as part of a hydraulic system which the liquid to be treated flows through (on-line electrolytic chlorinators). The water being treated may contain a natural residue of a halogen salt, usually sodium chloride; if necessary, an appropriate amount may be added. Within the cell are appropriate electrodes that communicate externally to a continuos current electrical supply. The electrolysis of the halogen salt occurs on the surface of the electrodes, and the corresponding halogen (chlorine, if the halogen salt is sodium chloride; bromine, if it is sodium bromide, and so on), hydrogen and, to a lower degree, oxygen, are formed.

As there is no separation between the anode and the cathode, the halogen combines with the medium to form the corresponding hypo-halogenites. The products of the electrolysis are taken outside the cell by the flow of water, and the hypo-halogenites is dissolved. The hydrogen and the oxygen, not very soluble in the medium, are expelled to the atmosphere by the exposed surface of the liquid. This type of equipment is generally known as hypochlorite generator, electrolytic chlorinator, salt water chlorinator or electrolyser.

Due to the low salt content dissolved we will occasionally refer to this solution quite simply as water or electrolyte, it being understood that it is an electrolytic solution, that is, water with a certain amount of salt or salts of one or more halogens. The first electrolytic cells of the type were built in segments of commercial plastic pipes with concentric tubular electrodes or electrodes in flat parallel grid or solid plates, attached to their inside, and electrical lead linking them to an external supply through sealed openings on the wall of the cell. The cells were installed in commercially available plastic pipes that are part of the system of the water to be treated.

A problem common to this type of equipment was the possibility of energizing the cells with the pump switched off, that is, without any water flowing through the cell. In this case, the operation of electrolysis can cause an accumulation of hydrogen and oxygen gases—a highly inflammable and explosive mixture—inside the hydraulic system, such as filters, pumps and other containers close to the electrolysis, with a high risk to people and facilities.

A few devices were added to the technique to prevent this possibility. We will mention some of these devices, still used with certain well-known equipment. One of these involves the installation of a flow meter in the pipes, interrupting the electrical supply of the electrolytic cell if the flow of water within the cell is interrupted. However, common flow meters usually have switching problems after a certain time, as their electrical contacts—very close to the flow of the electrolytic solution—are easily oxidized by steam and halogens.

Another solution for the problem was the design and adoption of a shunt shaped like an inverted "U" placed vertically in the water pipes. The cell can be placed in one of the segments of the inverted "U"; its set of electrodes must be higher than the entry and outlet level of the water. If there is no flow of water to conduct the hydrogen and oxygen thus formed outside the cell the electrolysis will only produce the required amount of these gases required to fill in the shunt and thus eject the electrolytic solution that remained within the cell. If there are no electrolytes close to the electrodes the electrolytic process is interrupted.

In the absence of a term that better defines it and for greater clarity we will henceforth call this device the "capacity of self-extinction of the electrolysis".

The shunt is made by the person installing the electrolytic cell; this person is not effectively controlled by the equipment manufacturer. The shunt may later suffer alterations because of mending or changes in the system of pipes. Therefore an improvement of the device, described by U.S. Pat. No. 4,861,451, included this device in the actual electrolytic cell, that is, giving the cell the shape of a pipe like an inverted "U" where the electrodes are on the horizontal part. The entry and outlet of the electrolyte occurs in the two vertical pipes that are also used to connect it to the hydraulic system. This configuration leads to the production of a necessarily large facility for a relatively small electrode area.

Another variation of the "capacity of self-extinction of the electrolysis" was added to the electrolytic cell model described in the request for Australian patent nr. AU-A-1110/88. It was described as a chamber formed by an upper and by a lower part. The entry and the outlet of the electrolytic solution occurs on the lower part, placed horizontally in diametrically opposing points, or vertically on the lower part at opposing ends, as in the model previously described, separated only by a dividing wall. The upper part holds a compartment for the set of electrodes (ascending flow electrode chamber), also separated by a division but only until the height of the electrodes. Above this height the chambers communicate. These electrodes, which can be flat plastic plates both entire or grid-like, can be placed both vertically and longitudinally in relation to the flow, that is, they may be perpendicular and adjacent to the division, or vertical and across the entry of the solution. In this case the last electrode next to the effluent chamber (necessarily a smooth flat plate) will substitute the upper division. When we juxtapose the upper and the lower parts we have a single recipient, with vertical divisions that combine to form a sort of dam. When the electrolyte flows through the cell it must cover the set of electrodes and flow over the upper division before it leaves through the outlet compartment (effluent chamber), which only serves to drain the solution. Electrolysis does not occur in this chamber.

This type of solution involves an increase in the physical size of the cell, that ends up by incorporating, in addition to the electrodes (electrode chamber) an additional empty vertical compartment (effluent chamber) dedicated to the flow of liquid.

The two above-mentioned configurations of the internal or external additions of the "capacity of self-extinction of the electrolysis" in the cell imply, on one hand, a smaller relation of the area of electrodes per volume of electrolytic cell or volume occupied by the installation and, on the other hand, an increase of potential danger should the cell become full of hydrogen and oxygen, since it can contain more gas.

We should emphasize that Australian regulations (Queensland Gas Examiner—1881), accepted and adopted by SOASA—Swimming Pool and Spa Association of Australia Limited, according to the Safety Guide for Electrolytic Chlorinators (Electrolytic Saline Chlorinator Safety Guidelines, Esc-2, 1989), has determined that the amount of accumulated gas in a hydraulic facility with this type of cell—that is, throughout the inverted U-shaped shunt—cannot be more than two liters. This requirement, therefore, limits the volume of the aquatic systems to be treated—swimming pools or cooling towers. They can be treated with equipment built according to the technique described above as long as it complies with such regulations.

Another proposal developed not to substitute but to complement the safety of the electrolysers in order to avoid that the installation fill up with gases has an electronic gas detection system that measures the conductivity between an auxiliary electrode located internally at the top of the cell (gas sensor) and one of the main electrodes (anodes or cathodes). Should there be an accumulation of gases within the cell, the conductibility—guaranteed by the liquid within the cell— is considerably reduced due to the low electrical conductivity that characterizes non-metallic gases, and the source will cut the supply of electrical energy to the electrodes. However, as the auxiliary electrode sensor is fed by a continuos current, it may undergo a polarization that can inhibit its sensing capacity.

Electrolytic cells fed with continuos current need periodical cleaning to remove eventual deposits of calcium salts and other minerals present in the water from their cathodes, as the presence of such salts considerably reduces the efficiency of the electrolytic cells considerably. The frequency of this cleaning operation depends on several factors, the most significant one being water hardness, which usually occurs because of the immersion of the cathodes in an acid solution. In several types of electrolysers this operation is facilitated by the incorporation of a device to remove and replace the parts to be treated into the design of the cell.

Some types of equipment allow the removal of the set of cathodes, while others with anodes and cathodes as a single block or beam only allow the removal of the entire set of electrodes. When the entire set is removed for cleaning the anodes (with a valuable and fragile coating of noble metals) are unprotected. Removing and replacing only the cathodes alleviates the problem, but subjects the valuable fixed anodes to scratches and damages from the cathodes when the operation is executed, especially when removing cathodes with thick mineral crusts that may also be attached to the anodes from the cells.

The electrical safety of these units is vitally important. In some models the cathodes are grounded, that is, the grounding is executed by the same electrical cable that takes the current to the cathodes. As this equipment works with relatively high currents, any fault in connector contact eliminates the grounding from the unit. This can be fatal for any living being that comes into contact with the electrolytic solution, even if the difference in potential is low.

SUMMARY OF THE INVENTION

The electrolytic cell for the generation of hypo-halogenites, object of this invention, includes significant improvements in operation, safety and maintenance work so as to overcome the problems listed above. The improvements are described below.

The first objective of our system is the concept of a more compact configuration that allows the maximum use of the electrolytic cell with an increase in the proportion between the electrode area and the volume of the electrolytic cell compared to the equipment available so far without eliminating the "capacity of self-extinction of the electrolysis".

This objective is attained based on an electrolytic cell in the form of a closed chamber, constituted by two main parts coupled hermetically to one another by means of a conventional attachment and pressure. The lower part (or base) is installed as part of the system's pipes; there is a sub-chamber for entry and another one for outlet, axially aligned on the same horizontal plan and separated by a vertical barrier transversal to the flow of liquid, and a second, higher chamber (the electrode chamber), located on this base, in internal communication with it, that can be occupied throughout its volume by a set of electrodes of flat plates, smooth or grid-like, parallel and equidistant, combined in beams or sets, that extend vertical and longitudinally or vertical and transversely from any wall of the electrode chamber to the opposite wall, or by a set of tubular, flat or grid electrodes, placed at an equal distance, vertical and concentrically. The set of electrodes can occupy the entire horizontal extension of the electrode chamber, as long as their lower extremities are above the entry and outlet level of the base. This set with the base and electrode chamber must contain constructive and accessory devices able to direct, distribute and renew the flow of water within the cell so that, between the entrance and outlet of the cell, the water will flow along an inverted "U" and contact the surface of the electrodes, executing the electrolysis, both in the ascending and in the descending direction with the necessary turbulence for it to take the gases generated there to outside the cell.

The electrode chamber, shaped like a bell, can have a cylindrical, cubic, pyramid or paving-stone format or a combination of all of these. It occupies the upper part of the cell and its inside can be partially or totally occupied by flat electrodes, either smooth or grid-like, with a cylindrical, oval, rectangular section, preferably in the same format as the bell, vertical and concentrically placed, with equidistant walls.

In facilities where the flow of the electrolyte doesn't have enough pressure to fill the cell, or the turbulence required to take all the gases generated there outside, simple devices can be adapted inside it to raise the height of the vertical transversal barrier between the cell's sub- entry and outlet chambers, prolonging this barrier until the top of the electrodes, if necessary, and/or dislocating the vertical barrier to get closer to the entry or outlet of the base.

In the first case the electrolytic chamber is divided into two vertical parts, each one called a sub-chamber, one with an ascending flow and one with a descending flow, but with the same speeds and volumes.

The relations between the volumes and the speeds of the sub-chamber were altered by the dislocation of the said division. In both cases the electrode chamber occupies the entire volume of the upper part of the electrolytic cell and continues operational, that is, producing the hypo-halogenite both in the ascending sub-chamber and in the descending sub-chamber. These alterations allow the electrodes to be submerged during the electrolysis even with very small flows. It also allows the gases generated during this operation to be carried out of the cell by the flow of the electrolyte.

Below follows a description of the way the cell is built. This ensures additionally that the electrolyte follow the inverted "U"-like route, both with regular flows and small flows, to obtain the total filling of the electrolytic cell in such a way that this electrode chamber, without any alteration in construction, can be installed on the base both longitudinal and transversely to the flow of the electrolyte by a simple turn of the electrode chamber at 90° around its vertical axis. It can also receive an adequate and simple device to "memorize" this particular position of the electrode chamber so as to avoid involuntary altering of the electrode's position during subsequent disassembly for cleaning and maintenance.

Another objective of this invention is the total protection of the electrodes when they are removed from the electrolytic cell for cleaning, transportation or storage. This device is made feasible by the building of a bell-shaped electrolytic chamber within which all the electrodes are placed, packed and locked, communicating with external terminals for the electrical connection to the outside energy supply. This bell, in turn, is coupled to the base by conventional means.

If the bell is made from transparent material it will allow a view of the electrodes inside. This facilitates inspection to determine the state of the electrodes, the amount of lime accumulated on their surface and any other eventual abnormalities. If maintenance is required, if the user has to change them or should any other operation be necessary it is enough to disconnect the electrical contacts coming from the energy supply from the bell and remove them without any further disassembly, as the bell is a single block within which the electrodes are attached and locked.

The set of electrodes can thus be handled, transported or stored, always protected by the bell, and the layers of precious metals that cover the anodes will not be scratched or damaged by contact with other material.

Another objective of this invention is to allow acid cleaning of the electrodes. The bell that houses them is acid-resistant, and has been designed so that, if tilted, it can serve as the recipient where an appropriate amount of acid solution concentrate will be poured to submerge the electrodes and subsequently clean them.

Another advantage provided by this type of configuration is that this electrolytic cell allows the installation of its base only, duly closed at the top by an appropriate closure, in a first phase, like when the hydraulic system is built first and the electrode chamber and the supply of energy are installed later.

Should repairs be required this device makes it possible for the electrode chamber of the already installed electrolytic cell to be removed and sent for repair, substituted by a new chamber or for the appropriate closure placed on top of the base. The water system can be begin to operate again immediately, without having to remain out of action.

Another objective is to develop a way to detect the presence of gases inside the cell without immersing the sensors directly into the electrolyte.

This is possible through the adoption of a small inwardly-turned bulb on the outer upper part of the electrolytic chamber; one or more electronic components are installed in this small bulb. The electrical parameter of these components can vary in view of the temperature they are submitted to. The device is immersed in a solid or liquid heat-conducting substance, and the housing thus formed is closed by a closure through which two metallic terminals connect the component or the association of components to the supply of electrical feed.

The above-mentioned supply, that supplies a constant current to the electronic component, provokes heating. The flow of the solution inside the electrode chamber in contact and the continuos renewal with its upper inner wall (and, therefore, in direct contact with the outer wall of the housing of the said component) cools the housing while maintaining a constant temperature.

However, if for some reason the flow is suspended, the accumulated gases at the top of the electrolytic cell will hinder the cooling of the housing and the component will heat quickly, resulting in a variation of the electrical parameter immediately detected by the electronic circuit, that will shut off the current feed to the cell.

A few components that meet these finalities are diodes, transistors, NTCs (Negative Thermal Coefficient), PTCs (Positive Thermal Coefficients) and other semi-conductors.

Thus, although the model described below has employed NTCs or PTCs as sensors, electronic components whose resistance varies in view of the temperature can also be used.

Moreover, depending on the degree of thermal conductivity of the substance that conducts heat used to surround the NTC or PTC resistor (or any other electronic component), the time necessary for this resistor to attain the temperature that sets off the function of interruption of the current may stretch beyond the desirable time. To reduce this answer time to the minimum this heating period must be speeded up using one or more common resistors, with appropriate resistance values, linked in a series to the NTC or PTC resistor within the same housing. In that case the free terminals of this series are connected to the circuit of the electrical supply.

However, this solution has been proved unsatisfactory, considering that variations in the temperature of the water that circulates within the chamber may cause false indications by the above-mentioned sensor.

Thus, alternatively, a gas-detection system has also been designed, comprising a pair of electrodes placed on the upper part of the bell and linked to a supply of alternate current.

The current that circulates in the sensor system does not depend on the anodes or cathodes' being energized or not. This makes the system independent and safer.

The deposition of insoluble carbonates on the cathodes no longer affects the sensor system because this system is formed by two independent electrodes, without any link to the anodes and cathodes.

There is no deposition of insoluble carbonates on the electrodes that constitute the sensor because they are fed by an alternate current, therefore suffering an automatic cleaning process that is repeated 50 or 60 times a second, depending on the frequency of the local electricity network.

Finally, the fact that an alternate current circulates through the sensor system does not allow the electrodes to polarize, since their polarization is automatically inverted to a beat of 100 to 120 times per second as described above. In this case the automatic depolarization of the electrodes of the sensor system occurs.

Another objective is the introduction of dedicated grounding that contacts the effluent liquid from the electrolytic cell. This is obtained by the addition of a metallic screen made from electrolyte-resistant material that also withstands the products of the electrolysis at a point of the base adjacent to the outlet of the liquid, placed so as to have a perfect contact between the electrolyte that leaves the cell with a connector with outside communication linked to an adequate grounding device. The grounding ensures the safety of people who may eventually contact the electrolyte in the case failure of the galvanic insulation of any component of the electrical supply.

Finally, another objective is the introduction, into the electrolytic cell, of an upper closure with all the appropriate connections for the electrical linkage of the energy supply to the terminals on the upper outer wall of the bell. This closure, therefore, protects the terminal against external agents.

BRIEF DESCRIPTION OF THE DRAWINGS

The object of this invention is clearer if we look at the attached figures, assembled to illustrate (and not limit) the invention, where.

DETAILED DESCRIPTION OF THE INVENTION

According to the illustrations described above, this invention comprises a chamber formed by a base (1) to allow its installation in the hydraulic system where the entry and outlet of the electrolyte occur; an electrode chamber (2) attached to the base (1), communicating with it on the inside but with a hermetic closing in relation to the outside through a tight flange coupling (3) on whose surface the electrolysis occurs and whose terminals (5) and (6) communicate to the outside by the top of this electrolytic chamber (2), coupled to an upper closure (7) that shelters the electrically conducting contacts (8) to outside the energy supply (not shown) by a set of wires (9). It also comprises a maintenance closure (10) (see FIG. 9) to substitute the electrode chamber (2) and maintain the hydraulic system in operation when it is not present.

The base (1) of the electrode cell (see FIG. 3 specifically) is manufactured preferentially in plastic material, chemically resistant to halogens and their salts and physically resistant to the pressures typical of the hydraulic system where it should be interspersed.

The above-mentioned base (1) consists of an open box, with a circular opening on the upper part, evolving to a square lower part and two opposing, slightly rounded vertical sides similar to arcs (11), from which protrude two cylindrical, diametrically opposed pipes (12) with two openings at their origin, one for entry (13) and one for outlet (14) of the base.(1). The free ends have an appropriate configuration, including internal and external threads, as well as flanges and other resources to connect tubular bodies to hydraulic networks.

The bottom of the base (1) is formed by two arc-shaped ramps that begin below each cylindrical pipe (12), close to the bottom ends of the vertical, arch-shaped walls (11). The ramps go to the center of the base inasmuch as they rise to its top, closing next to the upper circular opening in the form of two transversely placed, vertical and parallel walls, that constitute a dividing barrier (15). On the upper end, the above-mentioned ramps are separated by a duct (16) along their top with a vertically centered slit (17), so that the above-mentioned base (1) is divided into two symmetrical sub-chambers, one for entry (18), adjacent to the entry hole (13) and one for outlet (19), adjacent to the outlet hole (14).

The upper circular part of the base (1) has a mount to attach a joint or sealing ring (21).

Furthermore, this upper part has four small circular bumps, two of which with a central opening (22) and (23). The first is on the entry hole (13), and the second one (23) is at 90° counter-clockwise. Both or either can be occupied by a removable pin (24) with the same diameter, to serve as a memory of the position of the electrode chamber, (2), as we will explain below. Two other round compact bumps are also foreseen (25) and (26), located at 180° and 270° also anti-clockwise, respectively, after the first bump.

There is a small cylindrical elevation (27) around the perimeter of the upper circular opening of the base (1), flat inside and with a thread on the outside, so that the lower rim (28) of the electrode chamber can be centralized and attached to the base (1). It will be attached by an internal thread contained in the coupling flange for the perfect watertight sealing of the inner chamber formed by the set.

Externally, the base (1) is reinforced by devices similar to an angle brace (29) (see FIG. 5) that join the upper part of its vertical parallel walls to its upper circular part, as well as a lower vertical wall (30), longitudinal and centrally placed, perpendicularly linking the arch-shaped walls (15), which are the bottom of the base (1).

The electrode chamber (2) (see FIG. 2) consists of a bell (31), manufactured preferably in transparent plastic material, necessarily chemically resistant to halogens and their salts, as well as to strong diluted acids, especially commercial muriatic acid, and physically resistant to typical pressures of the hydraulic system where it must be installed.

The above-mentioned chamber (2) has a rectangular format. Its two opposing vertical walls (32) are outwardly rounded in the form of arches, and are interspersed between two opposing and parallel walls (33) closed on the upper part by a horizontal wall (34) above a horizontal narrowing point (35) distributed uniformly along its perimeter. Such a horizontal narrowing (35) makes the upper closure fit properly (7).

The chamber (2) is also open at the base (surrounded by a circular rim (28)); the rim connects the base to the chamber (1). The chamber contains a beam (4) formed by two interspersed sets (36) and (37) with one or more electrodes each.

Figure 1:
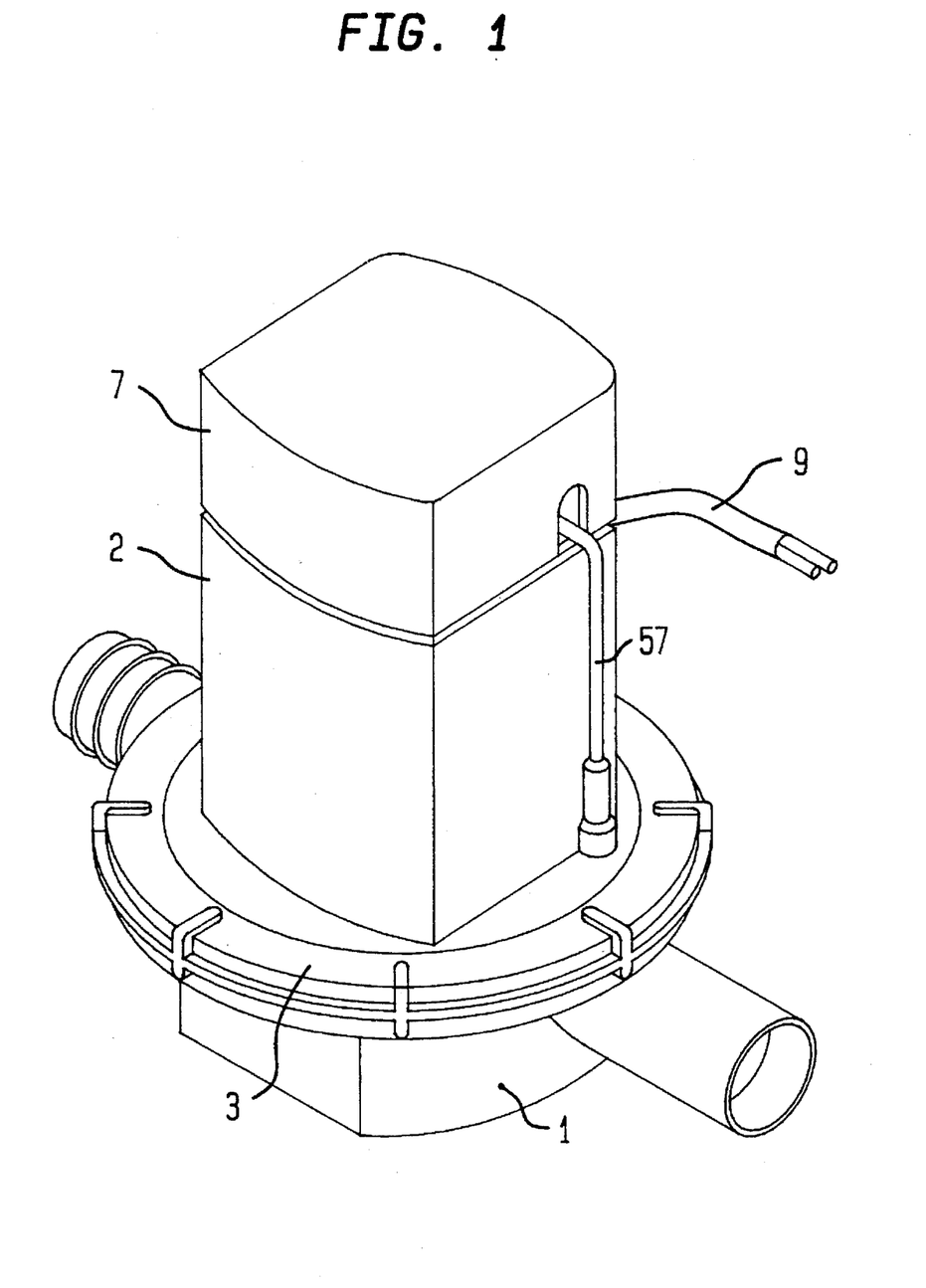
FIG. 1. is a view in perspective of the object of this invention, fully assembled.
Figures 2A, 2B:
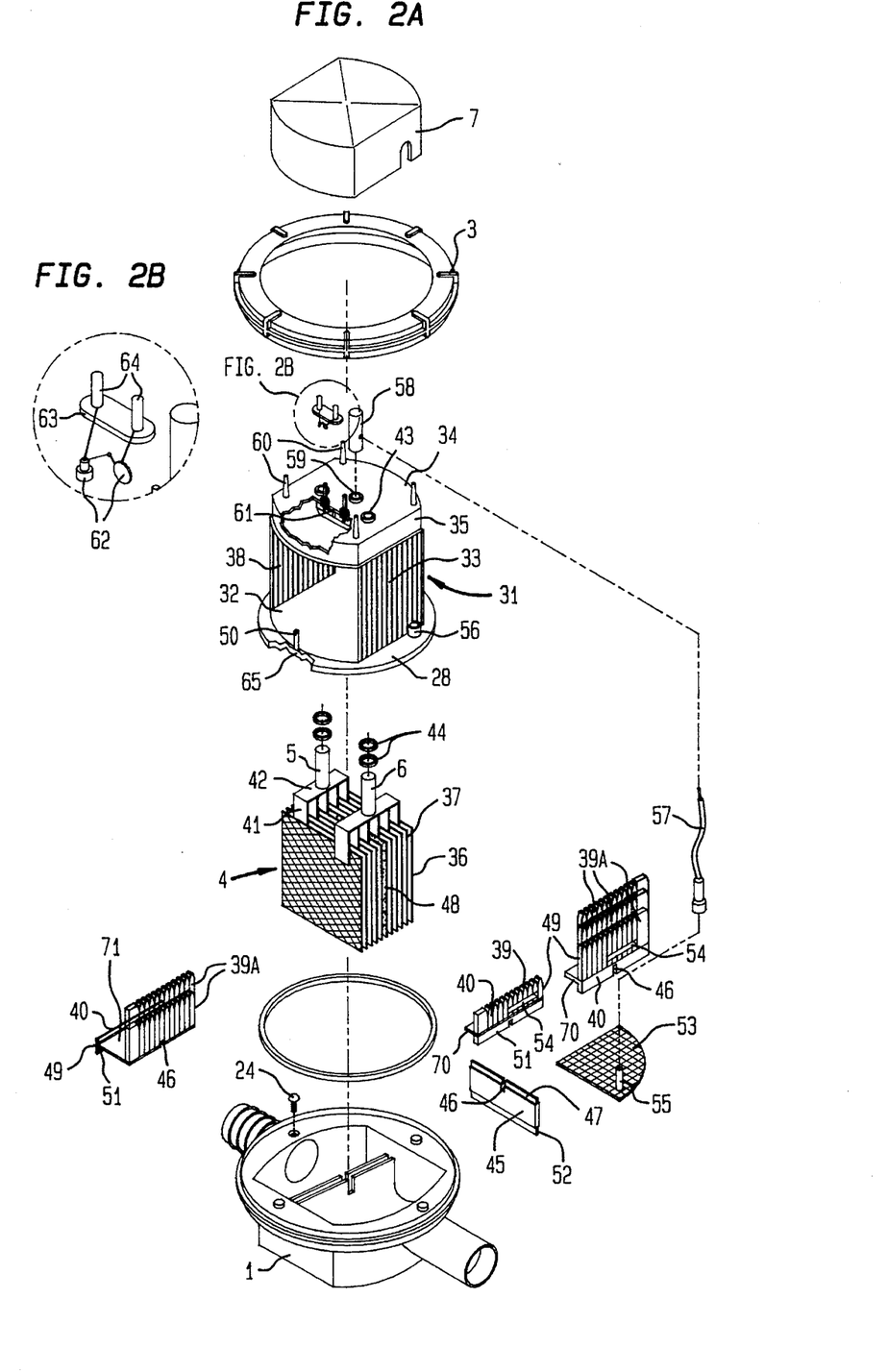
FIG. 2 is an expanded view of the object of FIG. 1; the beam of electrodes with flat parallel plates is placed longitudinally.
Figures 3A, 3B:
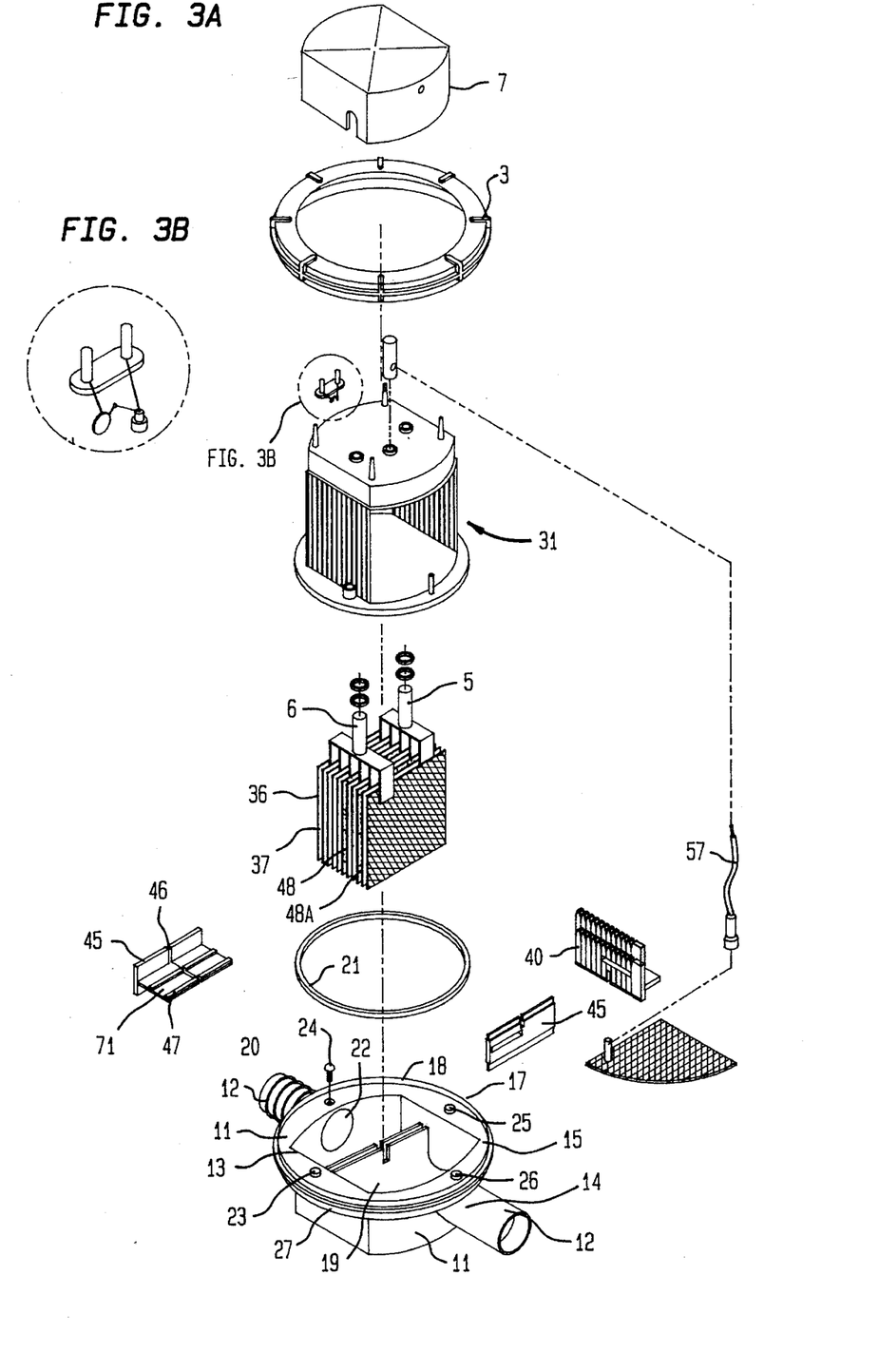
FIG. 3 is a view similar to FIG. 2; the beam of electrodes of the flat parallel plates is placed transversely.

The above-mentioned set of electrodes (36) and (37) are flat plates, whole or perforated, grid-like, or even a combination or whole and grid-like flat plates, parallel and equidistant among one another, as illustrated in FIGS. 2 and 3. The above-mentioned set, moreover, can have the form of vertical pipes with a circular, quadrangular or any other section, preferentially in the same horizontal section as the bell (31), concentric and equidistant amount one another, smooth or grid-like, or a combination of smooth and grid-like pipes, according to FIG. 4.

Each of these electrodes is electrically insulated from the neighboring electrode by means of fitting its vertical edges into also vertical slots (38) appropriately shaped, internally, on the parallel vertical walls of the bell (31) and by the fit of the central part of its lower horizontal edges among the spacing teeth (39) with a toothed bar (40), in the case of the tubular electrodes, and by the connection, individual and vertically, of each electrode, by the upper right or left upper edges, alternately, to laminar conducting supports shaped like an inverted "L" (41).

Each of the above-mentioned laminar conductors (41) is horizontally connected to respective parallel horizontal interconnections (42), also laminar. Each of the conductors (41) is linked to a pin that belongs to the pair of perpendicular pins that make up the positive terminal (5) and the negative terminal (6), which communicate externally to the bell (31) by the holes (43) on their upper wall (34) and through sealing rings (44) to preserve the cell's hermetic nature and to connect the two sets of electrodes (36) and (37) to the electrical supply (not shown).

In the case of flat parallel electrodes (as per FIGS. 2,3 and 5), a flat rod (45), resembling a ruler, is placed transversely and perpendicularly to the toothed rods (40, 40' and 40') by the juxtaposition of the slits (46) located in the middle of each and that stretch vertically from the lower part to half the height of the toothed bar (40), and from the upper part until half the height of the flat rod (45).

The upper part of the flat rod (45) has a gutter (47) that serves as a support and parallel fitting for the vertical extension of the central electrode (48). The vertical ends (49) of the toothed bar (40) and of the flat rod (45), when present, can be attached by gluing or other means to the slits (50) that exist for this objective on the inner vertical walls of the bell (31), to securely lock the electrodes inside.

Figure 5:
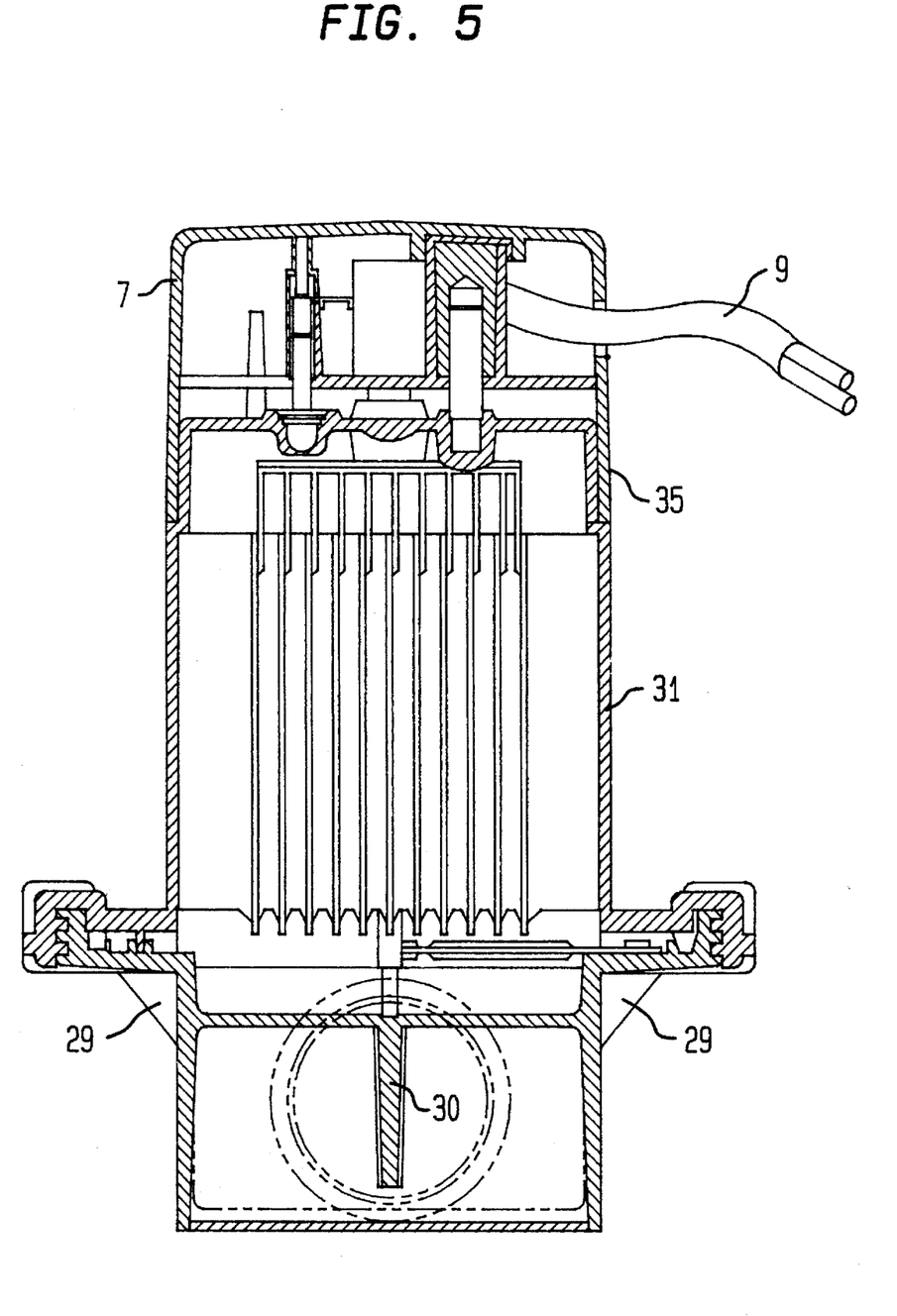
FIG. 5 is a cross-sectional view of the cell with the flat parallel plate electrode beam, according to FIG. 2.
Figure 6:
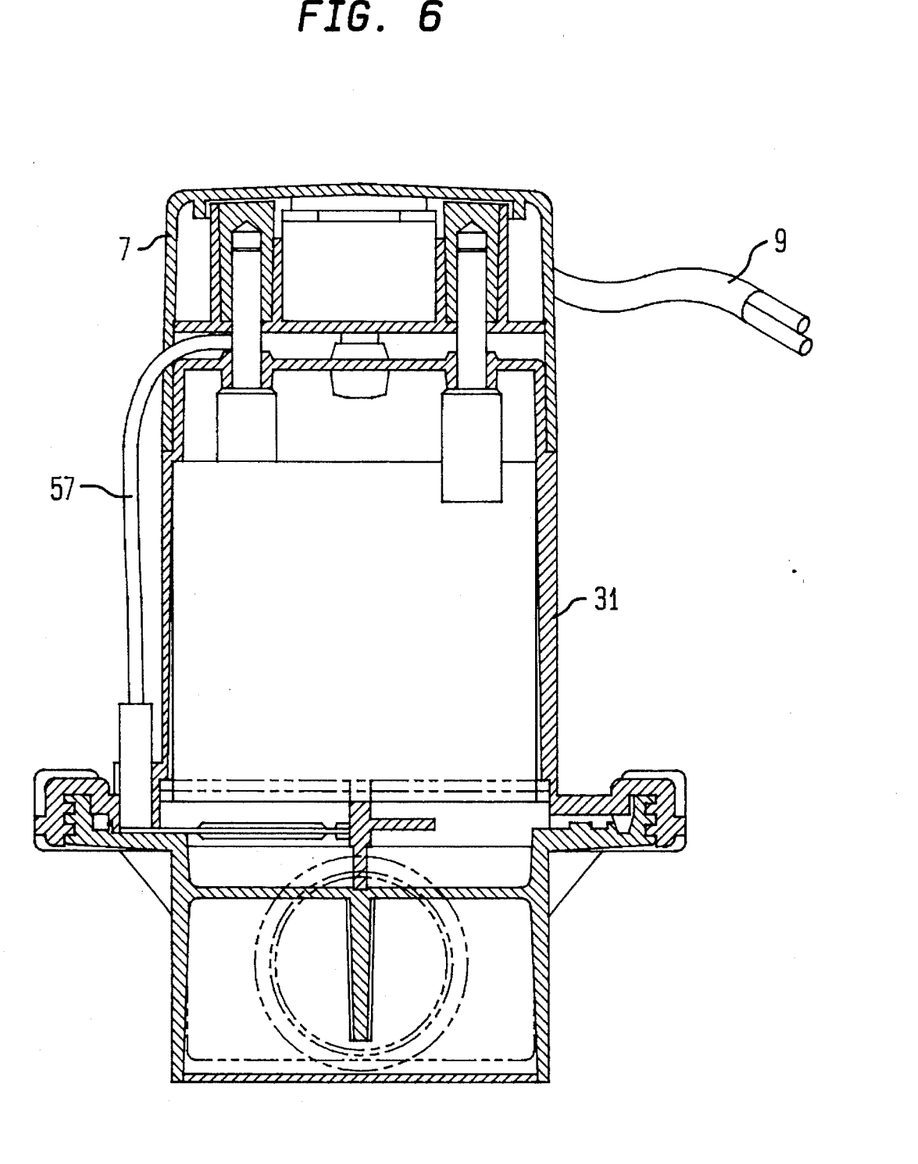
FIG. 6 is a transversal section of the cell, according to FIG. 3.
Figure 7:
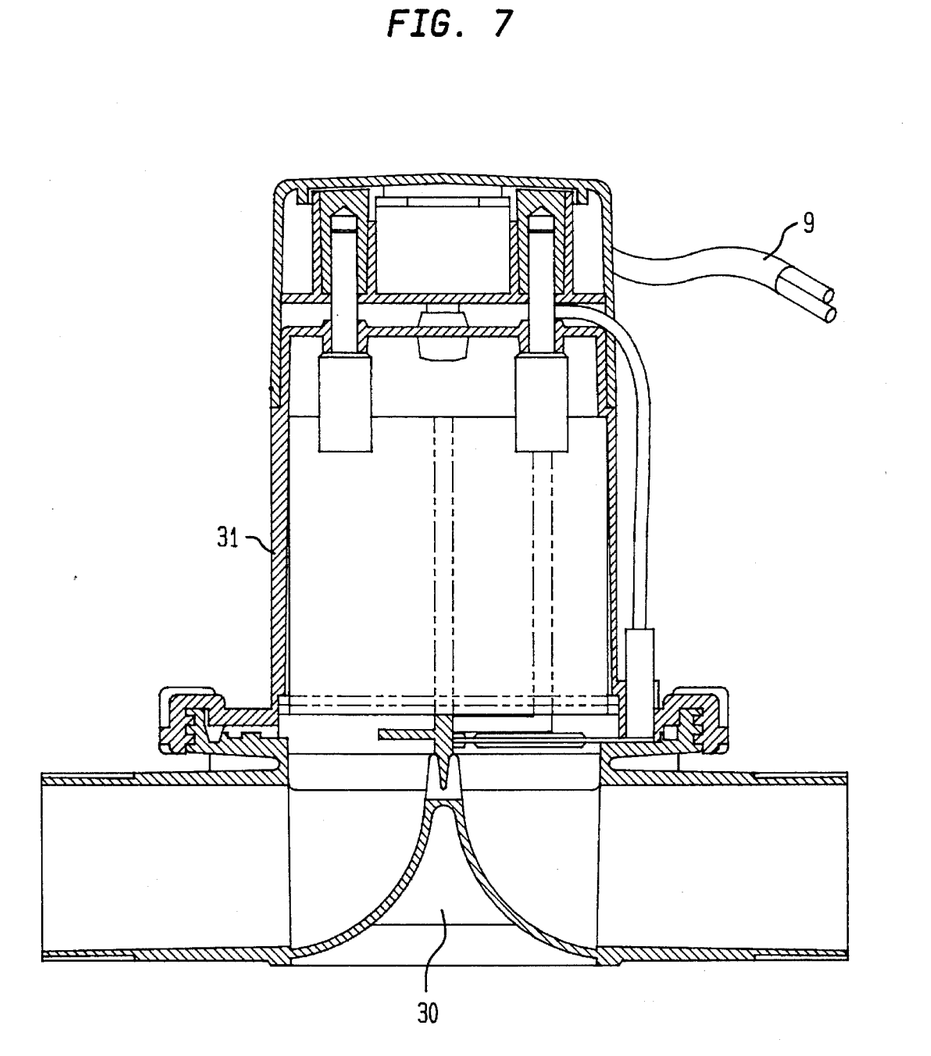
FIG. 7 is a longitudinal section of the cell, according to FIGS. 2 and 5, showing the dislocation of the central division.

The lower blade (51) of the toothed rod (40) and the lower blade (52) of the flat rod (45) have the same format to allow the adequate alternate fit and assembly in the gutter (16) and slit (17) of the dividing barrier (15) of the base (1), when the electrode chamber (2) is placed above it both with longitudinally arranged flat plate electrodes, as shown in FIGS. 2 and 5, and after a 90° clockwise turn of the electrode chamber (2) around its vertical axis, with transversely placed flat plate electrodes, as shown in FIGS. 3 and 6.

In the first case, with the electrodes longitudinal to the flow, the fitting is done by juxtaposing the lower blade (51) of the toothed rod (40) inside the gutter (16) of the dividing barrier (15) and the lower blade (52) of the flat rod (45) across the slit (17) in the flat bar. In the second case, that is, with the electrodes transversal to the flow, the fitting is done by juxtaposing the lower blade (52) of the flat rod (45) inside the division gutter (16), situation where the lower blade (51) of the toothed rod (40) crosses the slit (17) of the dividing barrier (15).

In the lower part of the electrode chamber (2), below the electrodes, or more exactly in the cross-quadrant formed by the union of the toothed rod (40) and the flat (45) rod which will always be adjacent to the base (1) outlet sub-chamber (19) when the electrode chamber (2) is installed above it, there is a horizontal flat quadrant-shaped grounding metallic grid (53), made of chemically electrolyte-resistant material, locked by the pairs of horizontal bumps (54) of the inner vertical walls of the toothed rod (40) and of the flat rod (45) when present, supported by the upper circular part of the base (1) immediately below the quadrant, connected to a vertical pin (55) made of the same material, which communicates to the outside of the electrode chamber (2) through an opening (56) in the bell (31) rim (28) for connection through an appropriate electric conductor (57) to the external grounding pin (58) fixed in its own housing (59) in the upper external wall (34).

Four correctly distributed pins with an appropriate length emerge (60) from the above-mentioned upper wall (34). They serve as support for the electrode chamber (2) when it is turned upside down after being removed from the base (1).

We have also designed a gas sensor system for the wall of the bell (34) formed by a bulb-shaped housing (61) protruding towards the inside of the wall (34), that does not communicate internally, filled with a heat conducting substance like chemical paste, thermal oil, silicone oil, or any other adequate substance, where one or more resistors are inserted, connected in series in this case, one of which must be an NTC (Negative Thermal Coefficient) or PTC (Positive Thermal Coefficient) resistor (63), hermetically insulated from the outside by a lid (63) fixed by gluing or another appropriate means, through which two vertical metallic terminals (64) in contact with the two poles of the NTC or PTC resistor (62), or of the two free terminals in the case of a series of resistors, will allow their electric connection to the external power supply (not shown).

Figure 10:
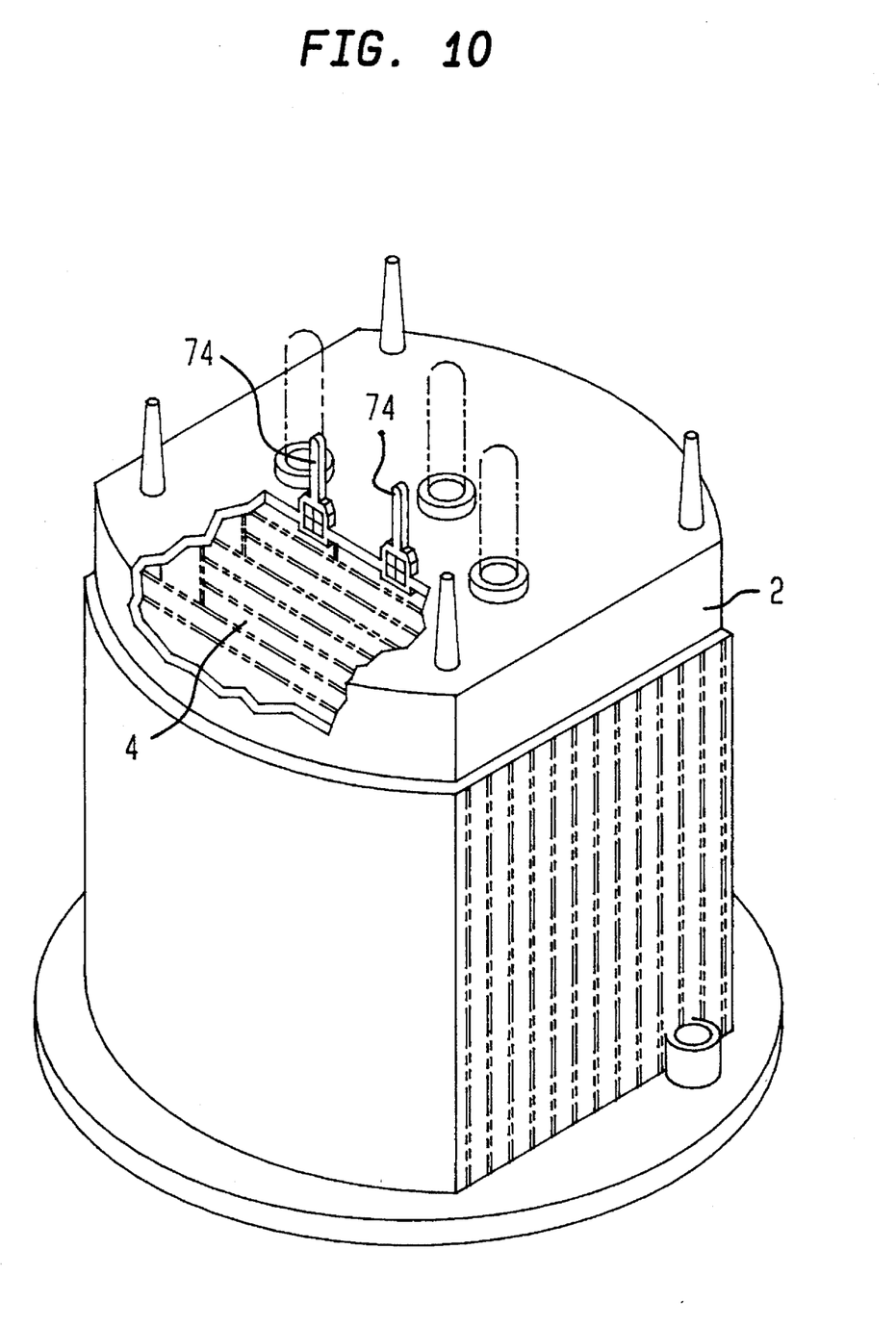
FIG. 10 is a view in perspective showing a partial section of the bell with an alternative sensor equipment.

According to FIG. 10, an alternative gas sensor system is foreseen, whereby the electrodes (74) of the sensor system are placed in the upper part of the chamber (2), particularly a pair of electrodes (74) which, piercing the top wall (34) of the bell (2) provide an electric connection between the inside and the outside of the chamber (2).

Thus the outside of the electrodes (74) is electrically connected to an AC power supply, as well as to an electrolytic cell operation blocking circuit (not shown).

The inner part penetrates the interior of the chamber (2), entering into direct contact with the electrolytic solution, thus allowing the current to pass between each electrode (74).

When there is gas formation inside the bell, the AC current from one electrode to the other is interrupted (74), thus activating the cell operation blocking circuit.

The lower part of the rim (28) of the bell (31) also has a pin-shaped (65) bump with the same diameter as the movable pin (24) and the cavities that exist in the bumps (22 and 23) on the base (1).

The objective of these elements is to identify the position in which the electrode chamber (2) is juxtaposed above the base (1), at the same time avoiding that other juxtapositions be unintentionally achieved when the components are temporarily disconnected from the electrolytic cell.

With the installation of the electrode chamber (2) in a certain position on the base (1), such as with the electrode beam (4) made of longitudinally aligned parallel plates or grids, the pin (65) of the bell (31) rim (28) fills the bump cavity (23) of the base. The lower blade (52) of the flat rod (45) crosses the slit (17) formed in the dividing barrier (15). In this case, the movable pin (24) is placed in the bump cavity (22), according to FIG. 2, which is the only other possible connection position for the electrolytic cell with hermetic closing by tightening the flange.

On the other hand, if we want to install the parallel plate electrode beam (4) transversally to the base, as shown in FIG. 3, the movable pin (24) is placed in the bump cavity (23), and the juxtaposition of the electrode chamber can only be done by filling the base (1) cavity (22) with the bell (31) rim (28) pin (65), while the lower blade (52) of the flat rod (45) fits into the gutter (16) of the dividing barrier (15) and the lower blade (51) of the toothed rod (40) crosses the slit (17) of the dividing barrier (15).

The same procedure is used for the electrode chamber containing tubular electrodes, except that in this case the flat rod (45) will not be there.

This way, using the "memory" pin (24) and the arrangements described above, the position of the electrode chamber and, as a consequence, the position of the electrode beam (4) will not be unintentionally changed in future disassembly and reassembly because the only possible position for connecting the electrode chamber is determined by the combination of the bell (31) rim (28) pin (65) with the free cavity (22 or 23) in the circular area of the base (1).

The upper lid (7) (see FIG. 4), made of electrically insulating material, preferably plastic, consists a box with the same shape as the upper part of the bell (31) on whose top it fits. The lid (7) is closed at the top and open at the bottom, creating a cavity where an internal basically laminar-shaped lid (66) is built at mid-height. The internal lid (66) houses at the top the female connectors (8) for the positive (5) and negative (6) terminals of the electrode beam (4), for the resistor (62) terminals (64) and for the grounding terminal (54). These connectors are housed in tubular vertical reinforcements (67) so as to be internally located between the lid (66) and the inner top of the upper lid (7). The terminals communicate with the open part of the lid (7) through holes in the internal lid (66) to allow the connection to their respective terminals (5), (6), (58) and (64) when the upper lid (7) is juxtaposed to the top of the bell (31).

From the female connectors (8) inside the upper lid (7) corresponding wires emerge, forming a single wiring whip (9), passing through a hole (68) in a vertical wall of the lid (7) and connecting the electrolytic cell to the power supply (not shown).

The upper lid (7) also has a slit (69) in one of its vertical walls to pass the wire (57) that connects the grounding grid (53) pin to the grounding terminal (58) at the top of the bell (31).

Several devices and accessories can be added to the inner part of the cell so as to divide it into two parts: one for the ascending flow going from the base inlet (13) to the upper internal wall (34) of the bell (31) above the electrodes (4) and the other for the descending flow which encompasses the remaining space of the electrolytic cell, from the internal upper wall (34) to the base (1) outlet (14). This makes the different types of flow and hydraulic system pressures— which may be of several kinds— compatible, and ensures that the operating cell remains always full of the electrolyte with a constant renewal of the electrolyte next to the electrode surfaces and to the bulb (61) that houses the NTC or PTC (62), as well as another resistor or resistors when present, and converts laminar flows into turbulent flows on the upper part of the electrode chamber to remove from the cell the gases generated during electrolysis.

Obstacles, preferably similar to bumps, can be incorporated to the inlet chamber (18) or above it, in the ascending flow of the electrolyte, to make the water whirl. For example: a horizontal blade-type bump (70) extending through part of or through the entire toothed rod (40) above the inlet sub-chamber (18) aims at provoking turbulence in the ascending flow of the electrolyte.

Other types of bumps may be placed along the ascending flow both in the base (1) and in the electrode chamber (2) to cause this desired turbulence and avoid laminar flows which do not have the same ability to trap and direct gases in their medium.

A preferred achievement, according to FIG. 2, is to use a flat electrode beam with parallel plates where at least the central electrode (48) of the electrode beam (4), which is seated on the flat rod (45) gutter (47), is a one-piece plate being the others either one-piece or a grid.

This way, when the electrolytic cell is incorporated to a normal flow hydraulic system, the electrode chamber (2) will be installed above the base (1) with its electrode beam (4) longitudinally to the flow which, when entering the cell, is sent upwards by the vertical barrier formed by the dividing barrier (15) of the base and by the toothed rod (40) of the electrode chamber (2). This is enough for the electrolyte to rise through the electrode plates to the inner top of the bell (31) and then shift direction, coming down through the opposite side to the outlet (14) wile maintaining the electrode chamber always full of liquid.

In the case of insufficient electrolyte flow systems this same electrode chamber (2) may be installed above the base (1) after a 90° clockwise turn around its vertical axis. Now the electrolytic cell, with the beam of transversely arranged flat plate electrodes, is divided by a barrier with the same height as the central electrode (48), that is, a barrier formed by the combination of the dividing barrier (15) with the flat rod (45) and the one-piece central electrode (48), as shown in FIG. 3.

This arrangement makes the flow of water leave the cell only after covering the electrode beam and internally contacting the wall (34) of the top of the bell. Note that in any arrangement the grounding grid (53) will remain adjacent to the outlet sub-chamber (19) of the base (1).

Figures 4A, 4B:
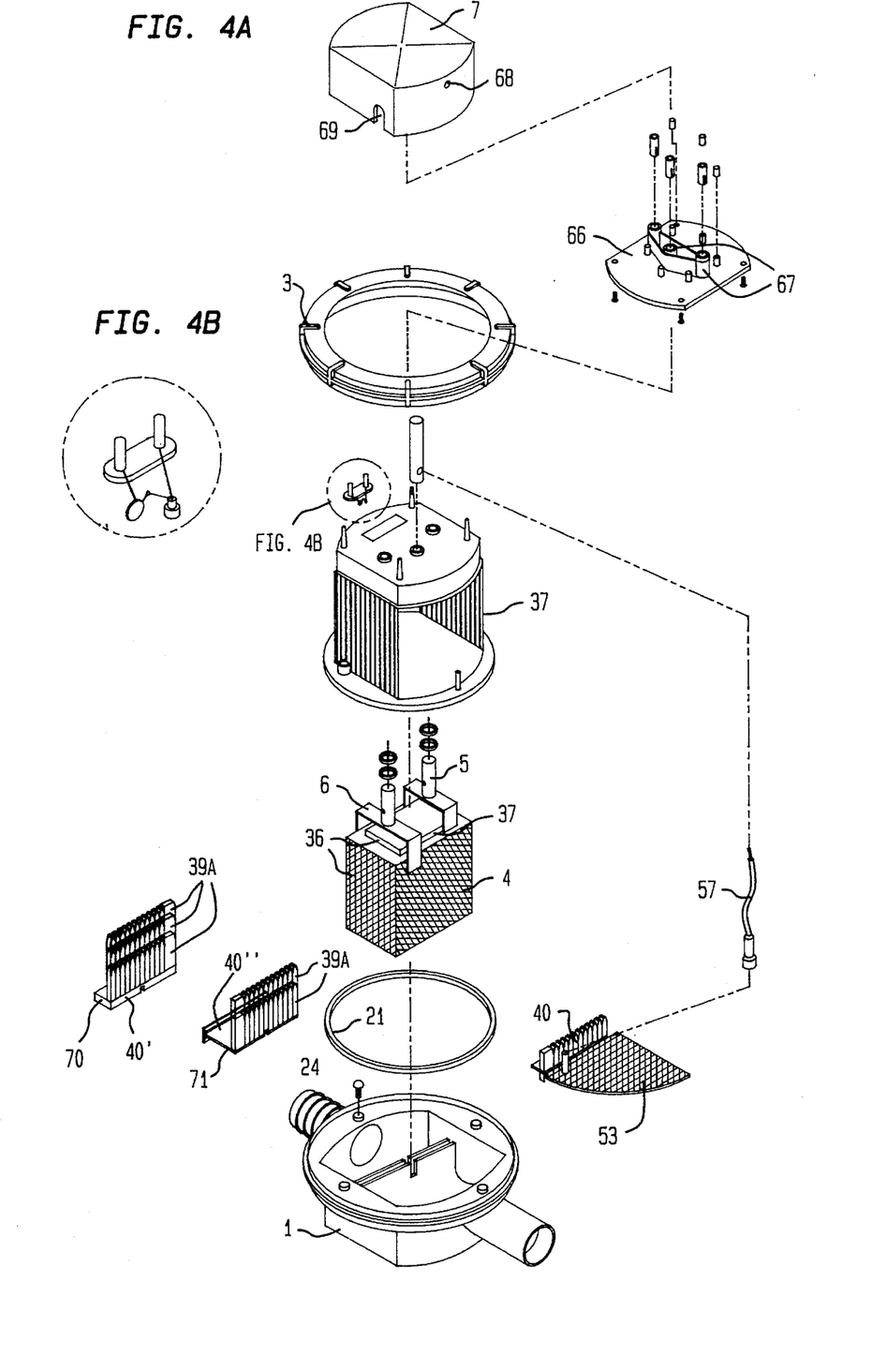
FIG. 4 is a view similar to FIG. 2; the beam of electrodes is formed by concentric pipes with a rectangular section.

Another example of an arrangement which may be introduced in cells of this type, both with flat electrode beams, as shown in FIG. 2, where the purpose is to keep them longitudinally to the flow, and with tubular electrode beams, according to FIG. 4, to accommodate smaller flows and pressures, is the elongation of the teeth (39A) of the toothed rod (40') to the desired height, as long as it does not cause a bottleneck of the flow next to the inner top of the cell above the upper edges of the electrodes (4), so as to create an ascending flow of the electrolyte from the cell inlet (13) to the highest barrier formed by the dividing barrier (15) of the base (1), plus the toothed rod (40), plus its elongated teeth (39A), then a descending flow from the cell top to the base outlet (14), ensuring that the cell is totally filled by the electrolyte.

Figure 8:
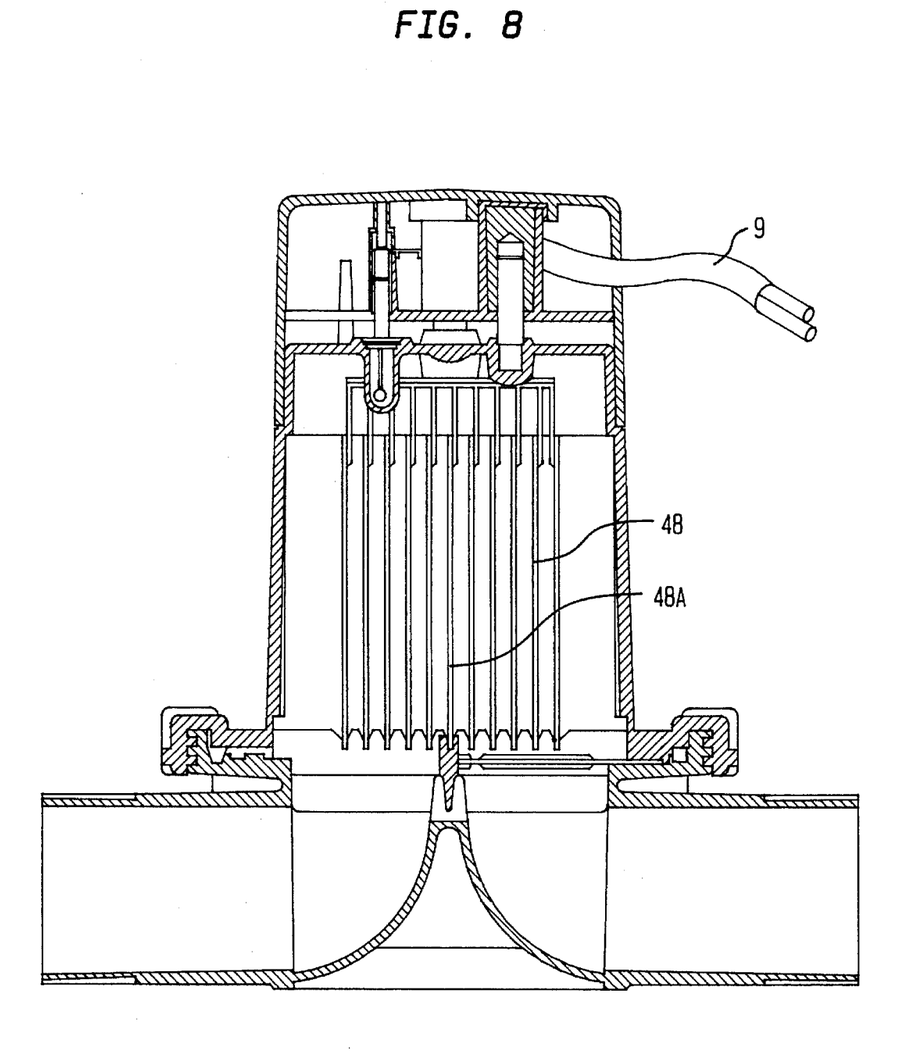
FIG. 8 is a vertical cross-sectional view of the cell according to FIG. 7, showing the beam of parallel plates combined to the transversal vertical central and dislocated divisions.

In another way of achieving this invention, in cells with longitudinally installed flat electrode beams, as well as in cells with concentric tubular electrode beams, a horizontal segment (71) may be incorporated to the toothed rod (40"), as shown in. FIGS. 2 and 4, with the same width as the rod and with the necessary length so that it does not totally or partially block the electrolyte entrance or exit, according to the side to which this horizontal segment will extend. Similarly, it is possible to combine this horizontal extension (71) with the elongation of the teeth (39A) of the toothed rod (40"). Similarly, according to FIGS. 3 and 8, in transversely installed flat electrode beams, the same horizontal extension (71) can be incorporated to the flat rod (45), horizontally displacing the central one-piece electrode (48A) inside the electrode beam to the point where it matches the gutter (47) of the flat rod (45), be it closer to the cell inlet (13) or outlet (14), so as not to block the passage of the electrolyte.

However the toothed rod (40, 40', 40") with its different shapes and the flat rod (45) with its extensions may be combined into a single part with the same purpose.

Figure 9:
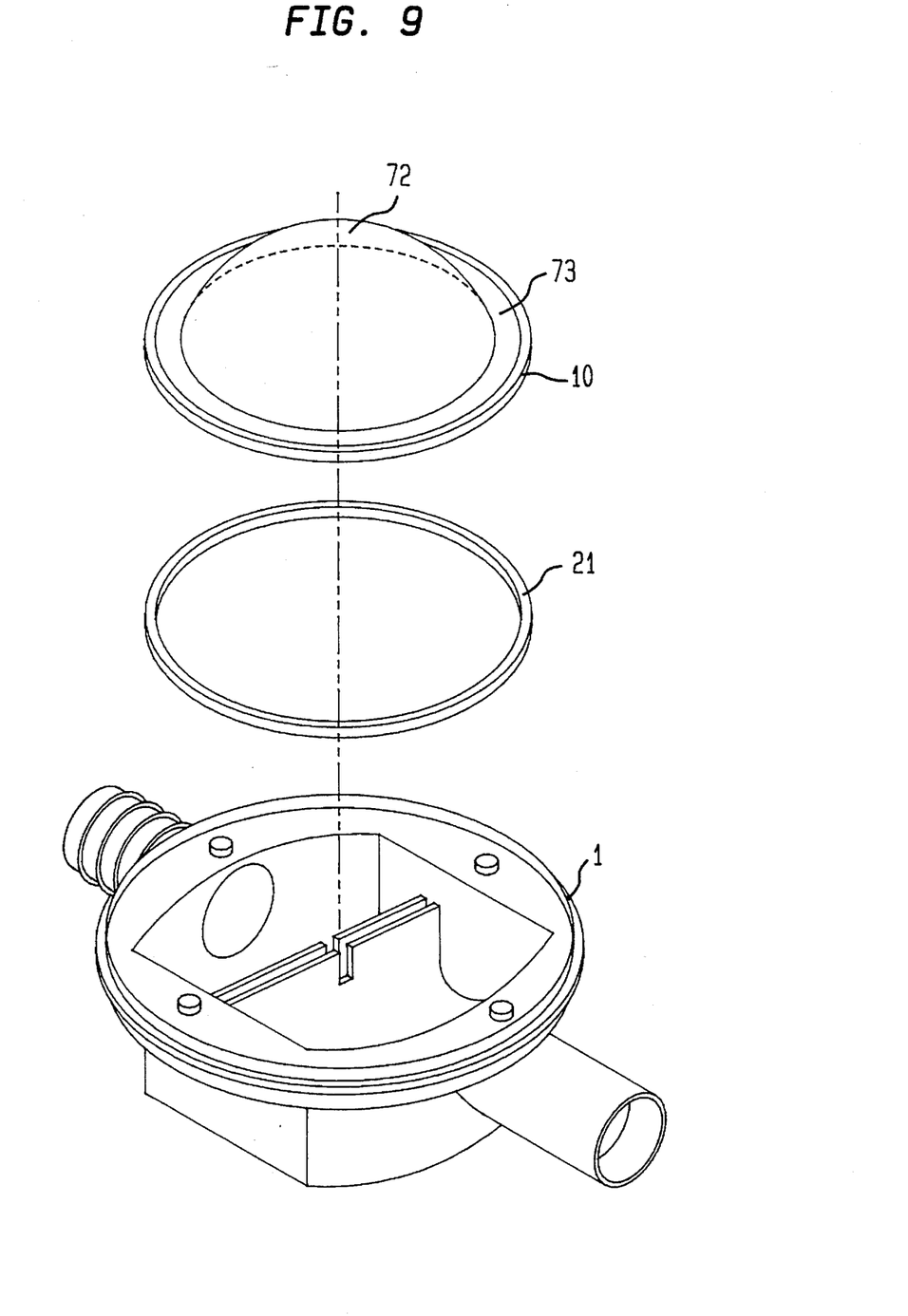
FIG. 9 is an expanded perspective view of the base of the cell and of the maintenance closure.

FIG. 9 shows a base (1), sealing joint (21) and maintenance lid (10), a part of the set, cap-shaped with the hemispheric center protruding towards the top (72) and surrounded by a horizontal rim (73) the perimeter configuration of which has the same shape of the bell (31) rim (28) to allow the tight closing of the base (1) using the same tightening flange (3), thus completing the necessary resources for the electrode chamber (2) to be removed for corrective or preventive maintenance without the inactivation of the water pipeline during its absence.

Similarly, the base (1) and lid (10) assembly may be installed at the time of the assembling of the hydraulic system, delaying the installation of the electrode chamber (2) and the respective power supply for any future date.

I claim:

1. An electrolytic cell comprising:

a base;

inlet means and outlet means protruding from said base;

a bell-shaped electrode chamber positioned above said base and said inlet and said outlet for providing a "U" shaped path from said inlet to said outlet;

a vertical barrier means coupled to said base for separating said base into an entry subchamber adjacent said inlet and an outlet subchamber adjacent said outlet, said vertical barrier formed of a pair of walls connected to each other with a top gutter, said top gutter having a slit therein;

a first set of electrodes positioned in said electrode chamber connected to a first terminal, said first set of electrodes being positive;

a second set of electrodes positioned in said electrode chamber connected to a second terminal, said second set of electrodes being negative;

a toothed rod for supporting said first set of electrodes and said second set of electrodes above said vertical barrier of said base;

a first, second, third and fourth bump positioned on the upper surface of said base, said first bump being positioned above said inlet, said second bump being located at 90° counter-clockwise from said first bump, said first and second bump having a cavity which can receive a removable pin for providing a memory of the position of said electrode chamber, or a pin of the bell, said third bump being positioned at 180° counter-clockwise from said first bump, and said fourth bump being located at 270° from said first bump, wherein said first set of electrodes and said second set of electrodes are selected from the group of: a plurality of flat plate electrodes; a plurality of grid flat plate electrodes; a plurality of tubular electrodes, and combinations thereof, wherein electrolysis occurs above said first and second set of electrodes and said first set of electrodes are electrically insulated from said second set of electrodes.

2. An electrolytic cell comprising:

a base;

a bell-shaped electrode chamber positioned above said base and said inlet and said outlet for providing a "U" shaped path from said inlet to said outlet;

a vertical barrier means coupled to said base for separating said base into an entry subchamber adjacent said inlet and an outlet subchamber adjacent said outlet, said vertical barrier formed of a pair of walls connected to each other with a top gutter, said top gutter having a slit therein;

a first set of electrodes positioned in said electrode chamber connected to a first terminal, said first set of electrodes being positive;

a second set of electrodes positioned in said electrode chamber connected to a second terminal, said second set of electrodes being negative;

rod means for supporting said first set of electrodes and said second set of electrodes above said vertical barrier of said base;

a first, second, third and fourth bump positioned on the upper surface of said base, said first bump being positioned above said inlet, said second bump being located at approximately 90° counter-clockwise from said first bump, said first and second bumps having a cavity which can receive a removable pin for providing a memory of the position of said electrode chamber, or a pin of the bell, said third bump being positioned at approximately 180° counter-clockwise of said first bump, and said fourth bump being located at approximately 270° from said first bump, wherein electrolysis occurs above said first and second set of electrodes and said first set of electrodes are electrically insulated from said second set of electrodes.

3. A cell according to claim 2 wherein said toothed rod includes a vertical slit the lower portion of said tooth rod is fitted in said vertical barrier means in said top gutter or in said slit.

4. The cell of claim 3 in which said first and second sets of electrodes are plate electrodes, said tooth rod is joined to a vertical flat rod of equal height, said flat rod has a central vertical slit from the top to its midheight and a central gutter along the top where the central electrode of the first and second sets of electrodes are seated, a lower blade of said vertical flat rod has the same shape as a lower blade of said toothed rod for allowing both to be alternatively attached to either said toothed rod or said vertical flat rod.

5. The cell of claim 4 wherein said teeth of said toothed rod rise to the height of said electrodes.

6. The cell of claim 5 wherein a central electrode is seated on said central gutter of said flat rod, said central electrode of said first and second sets of electrodes being seated on said central gutter, and said central electrode is a one-piece plate.

7. The cell of claim 6 wherein said toothed rod or said flat rod has a horizontal segment which projects laterally and is placed above said entry sub-chamber or said outlet subchamber of said base.

8. The cell of claim 7 further comprising a seat to support said central electrode positioned above said horizontal segment lateral to the flat rod.

9. The cell of claim 8 further comprising a metallic grounding grid of electrolyte-resistant material, horizontally located at a point below said first and second sets of electrodes and electrically insulated from the first and second sets of electrodes at a point of said electrode chamber adjacent to the outlet chamber of the base to contact the effluent even when the electrode chamber has a 90° turn around in its vertical axis, thereby dedicated grounding of said electrode chamber.

10. The cell of claim 9 wherein said electrode chamber is a standalone set which can be separated from the remainder of said electrodes, said toothed rod, said flat rod and said grounding grid are externally in the upper wall of the electrode chamber for connecting to said cell to an external source, thereby making said cell a container for the protection, safeguard, transportation and storage of electrodes.

11. The cell of claim 10 wherein the upper wall of the bell is a bulb-shaped housing turned towards the inside of said electrode chamber within said bell there is at least one electronic component whose electrical parameter can vary depending on the temperature to which it is being subjected, said electronic component is surrounded by a heat-conducting solid or liquid substance, and said housing is hermetically seated by a lid through which two metallic terminals connect the poles of the electronic component to an external electronic circuit.

12. The cell of claim 11 wherein the electronic component is chosen from the group consisting of NTCs (Negative Thermal Coefficient) resistors, PTCs (Positive Thermal Coefficient) resistors, diodes and transistors.

13. The cell of claim 12 when the electronic component is chosen from the group consisting of NTCs (Negative Thermal Coefficient) resistors and PTCs (Positive Thermal Coefficient) resistors.

14. The cell of claim 13 wherein said electronic component is connected in series to at least one linear resistor, all resistors being hermetically enclosed inside said bulb.

15. The cell of claim 14 further comprising a sensor system to detect gases inside said chamber, said sensor system comprises a pair of electrodes located on the upper wall said sensor system of said chamber, said electrodes being externally fed by an AC power supply and projected towards the inside of said chamber so as to remain submerged in the electrolytic solution when there is no build-up of gases inside the chamber.

16. The cell of claim 15 further comprising a lid for housing said electric connection of all terminals, said lid being juxtaposed to the electrode chamber for connecting all the terminals to the external power supply through a wiring whip.

17. The cell of claim 16 wherein the base of said electrolytic cell has a maintenance lid replacing said electrode chamber.

* * * * *